US011456585B1

(12) United States Patent
Baldwin et al.

(10) Patent No.: US 11,456,585 B1
(45) Date of Patent: *Sep. 27, 2022

(54) ELECTRICAL WALL PLATE WITH ACCESSORY SUPPORT

(71) Applicants: Jeffrey P. Baldwin, Phoenix, AZ (US); John E. Klein, Chandler, AZ (US)

(72) Inventors: Jeffrey P. Baldwin, Phoenix, AZ (US); John E. Klein, Chandler, AZ (US)

(*) Notice: Subject to any disclaimer, the term of this patent is extended or adjusted under 35 U.S.C. 154(b) by 5 days.

This patent is subject to a terminal disclaimer.

(21) Appl. No.: 17/158,951

(22) Filed: Jan. 26, 2021

Related U.S. Application Data

(63) Continuation of application No. 16/551,014, filed on Aug. 26, 2019, now Pat. No. 10,903,636.

(60) Provisional application No. 62/722,872, filed on Aug. 25, 2018.

(51) Int. Cl.
| | | |
|---|---|---|
| *H01R 13/60* | (2006.01) | |
| *H02G 3/14* | (2006.01) | |
| *H01R 33/94* | (2006.01) | |
| *H02J 7/00* | (2006.01) | |
| *G06F 1/16* | (2006.01) | |
| *H04M 1/06* | (2006.01) | |

(52) U.S. Cl.
CPC ............. *H02G 3/14* (2013.01); *G06F 1/1632* (2013.01); *H01R 33/94* (2013.01); *H02J 7/0045* (2013.01); *H04M 1/06* (2013.01)

(58) Field of Classification Search
CPC .......... H01R 33/00; H01R 33/94; H02G 3/14; G06F 1/1632; H02J 7/0045; H04M 1/06
USPC .................................................. 439/527–529
See application file for complete search history.

(56) References Cited

U.S. PATENT DOCUMENTS

| | | | | |
|---|---|---|---|---|
| 8,575,484 B1* | 11/2013 | Witherbee | ................ | H02G 3/14 174/58 |
| 9,647,400 B2* | 5/2017 | Atherton | ............ | H01R 13/6683 |
| 9,825,414 B2* | 11/2017 | Armstrong | ......... | H01R 13/6395 |
| 10,211,567 B1* | 2/2019 | Glahe | .................... | F16M 13/02 |
| 10,630,031 B1* | 4/2020 | Baldwin | ............... | H01R 13/717 |
| 10,903,636 B1* | 1/2021 | Baldwin | ............... | G06F 1/1632 |

* cited by examiner

*Primary Examiner* — Khiem M Nguyen
(74) *Attorney, Agent, or Firm* — Booth Udall Fuller, PLC; Kenneth C. Booth

(57) ABSTRACT

An electrical wall plate having a front face plate, an opposing rear plate face, at least one electrical device opening extending through both the front plate face and rear plate face, and at least one movable extension member configured to move and extend away from and also back toward the front plate face and support at least one electronic accessory device placed on the movable extension member is provided.

20 Claims, 11 Drawing Sheets

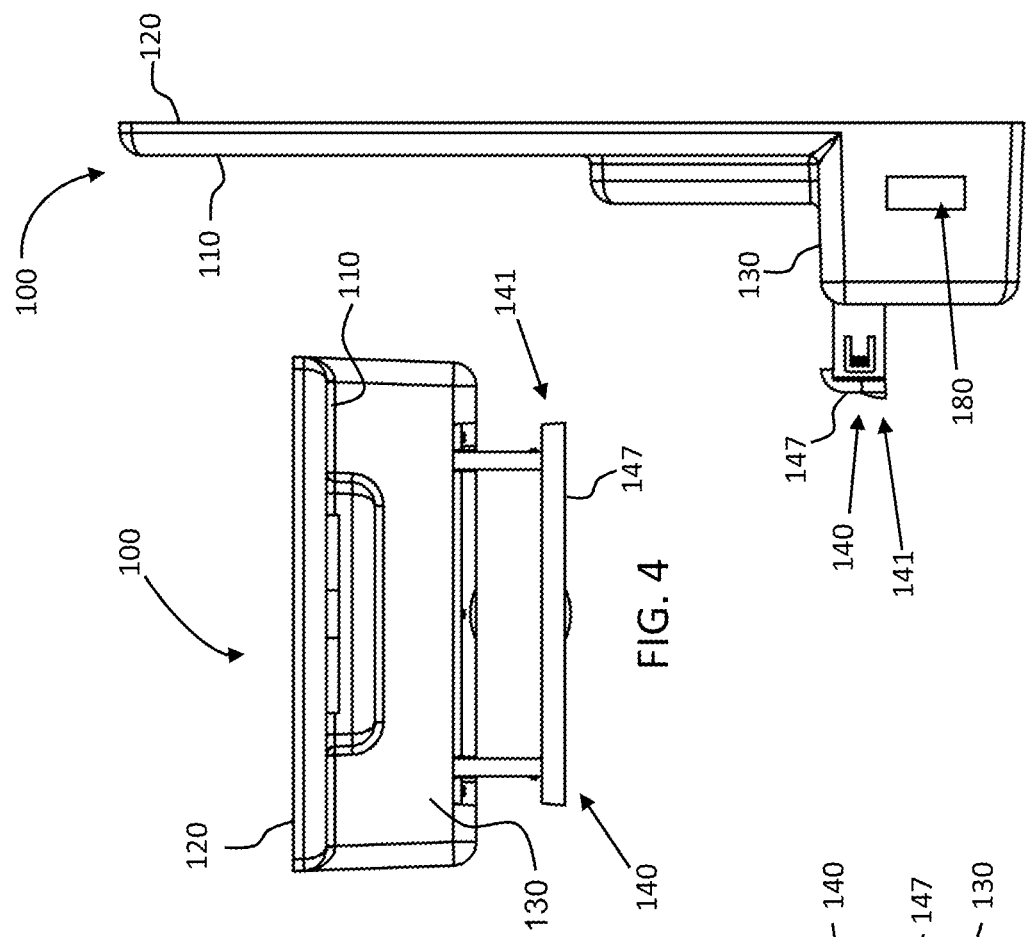
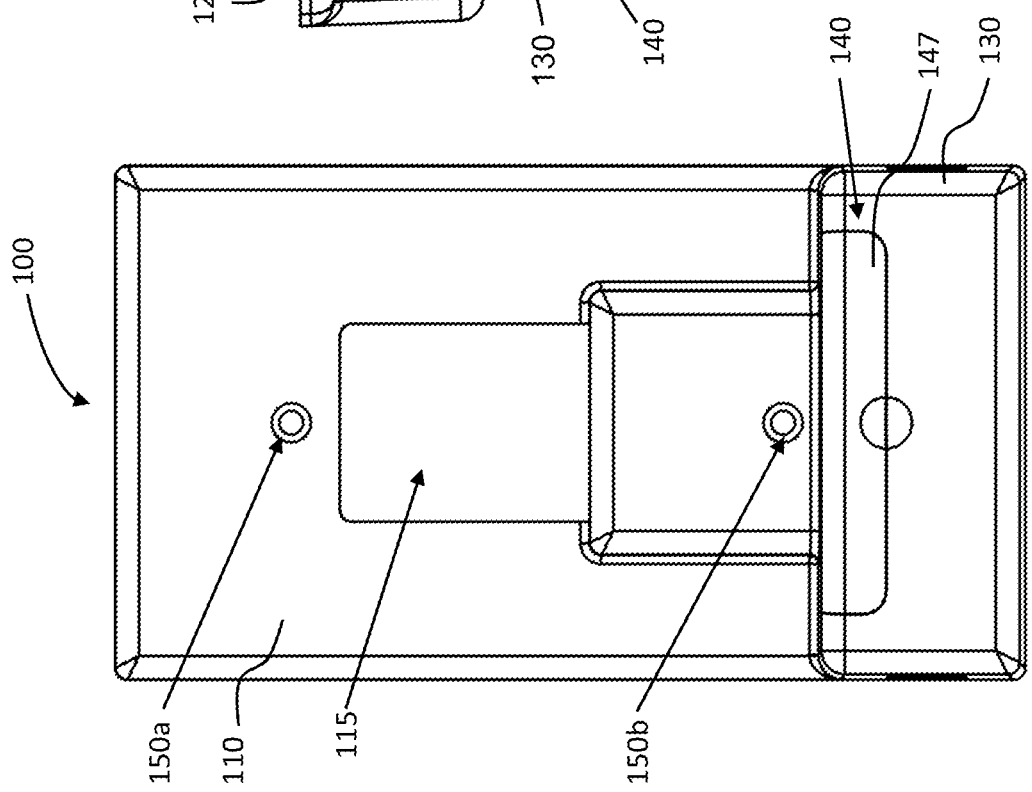

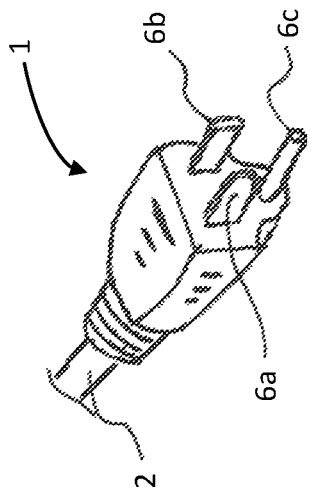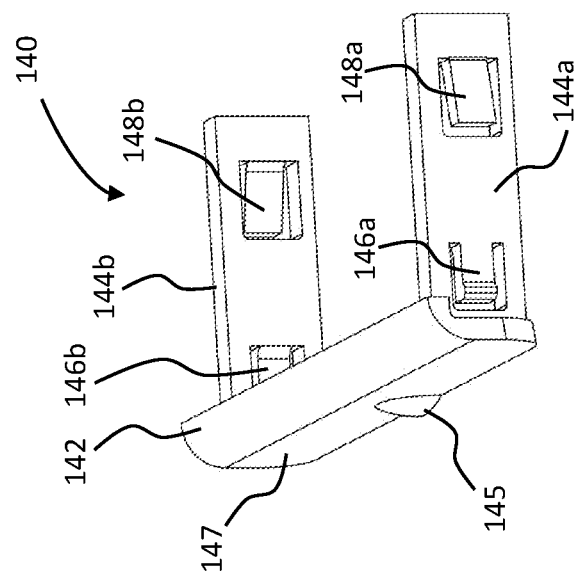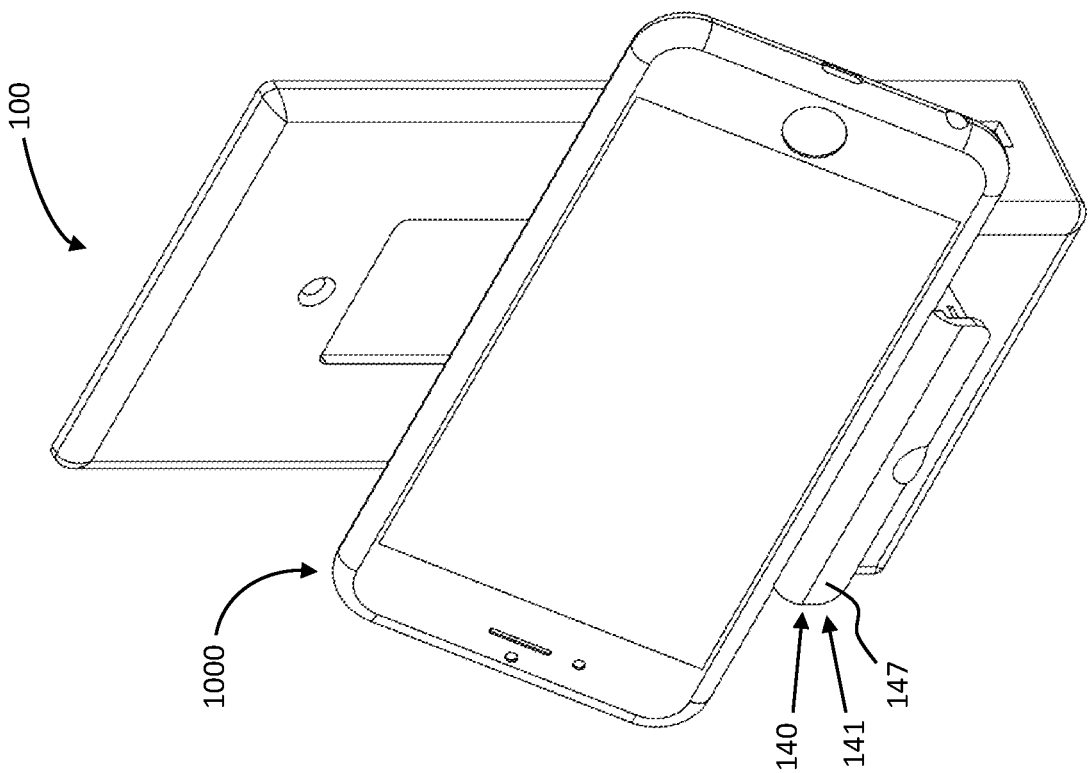

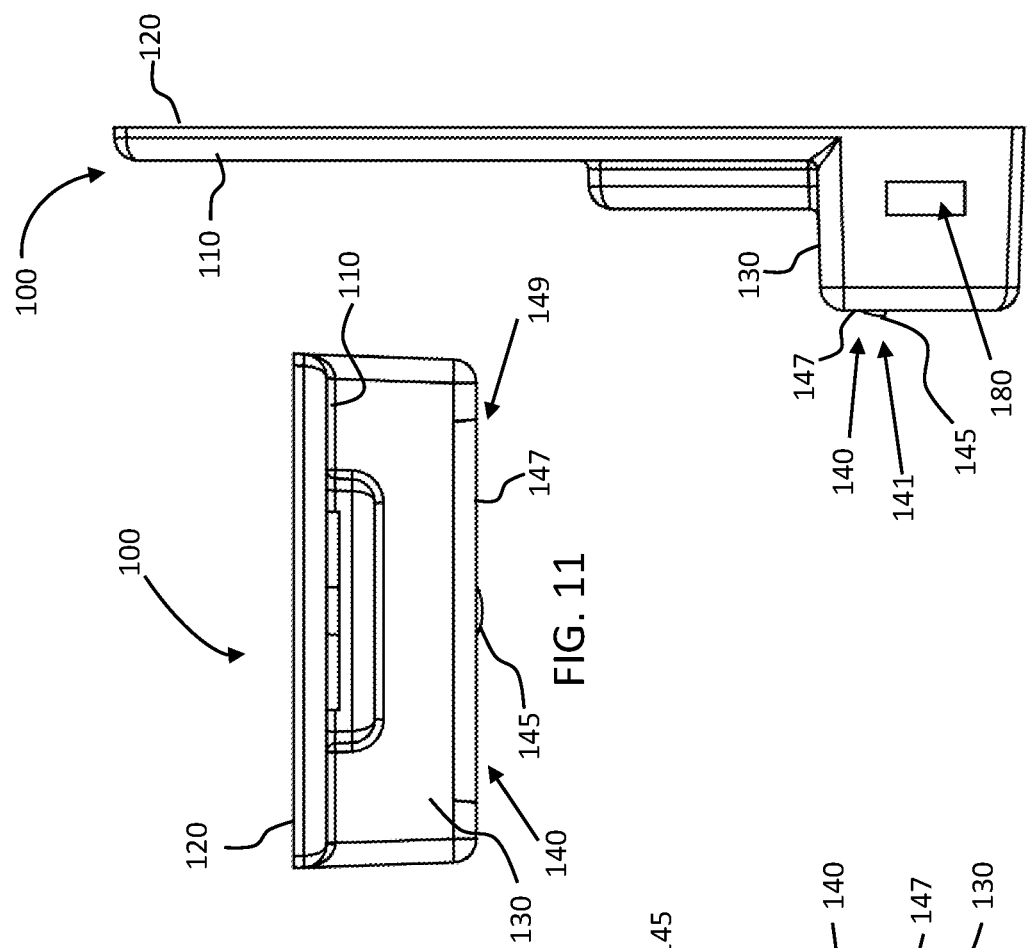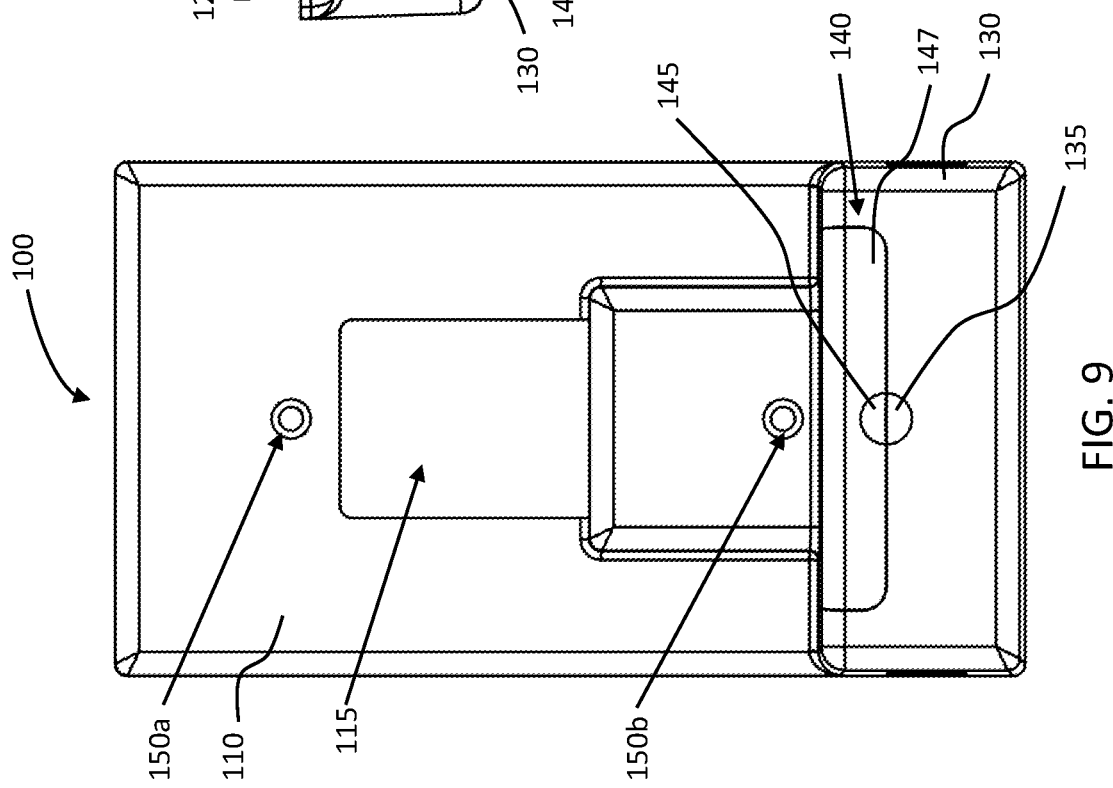

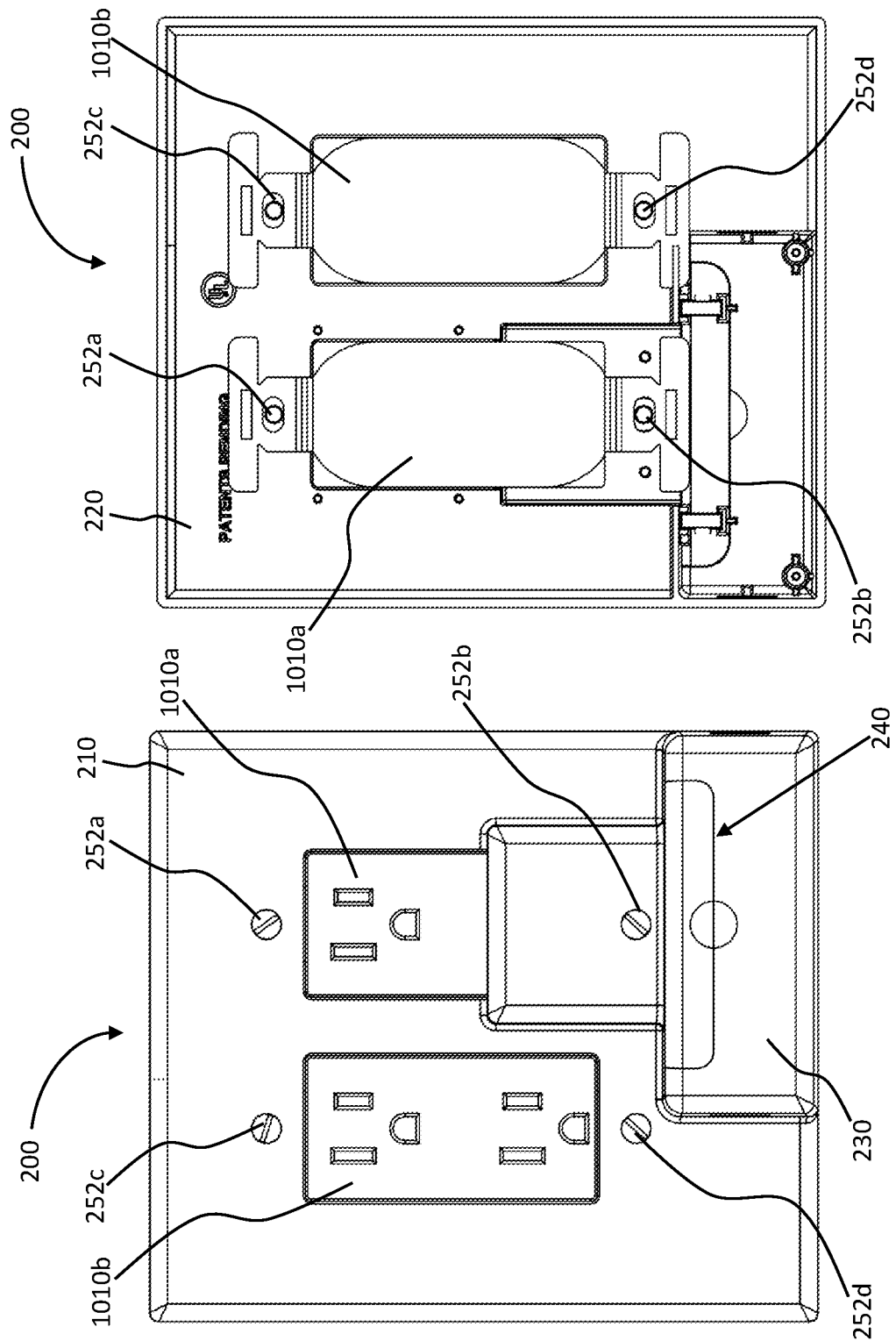

ELECTRICAL WALL PLATE WITH ACCESSORY SUPPORT

CROSS REFERENCE TO RELATED APPLICATION(S)

This application is a continuation of earlier U.S. Utility patent application Ser. No. 16/551,014, filed Aug. 26, 2019, and issuing as U.S. Pat. No. 10,903,636 on Jan. 26, 2021, which application claims the benefit of U.S. Provisional Patent Application No. 62/722,872, filed Aug. 25, 2018, the disclosures of which are hereby incorporated entirely herein by reference.

BACKGROUND

Technical Field

The disclosure relates generally to electrical wall plates and, more particularly, to electrical wall plates having an extendable mechanical feature for supporting an electronic accessory device.

State of the Art

An electrical wall plate is a typical device used to prevent access to electrical wires and electrical receptacles therein. Conventional electrical wall plates commonly mount to electrical receptacles via connection by fasteners, such as screws, or by a mechanical fit involving interlocking components designed to secure the wall plate to the receptacle. Electronic accessory devices, such as smart phones and tablet computers, are commonly utilized by billions of people each day. Such electronic accessory devices typically operate with internal batteries that require recharging several times a week, if not daily. The charging of electronic accessory devices often involves electrically connecting the electronic accessory devices to an electrical receptacle via a plug and attached electrical cord, requiring the electronic accessory devices to be located near the electrical receptacle within a distance less than the length of the electrical cord. Hence, a need exists for an electrical wall plate having an extendable mechanical feature for supporting an electronic accessory device, such as a smart phone or a tablet computer, particularly when the electronic accessory device is recharging via electrical connection with an electrical device, such as an electrical receptacle, associated with the electrical wall plate.

SUMMARY

According to an aspect of the disclosure, a powered wall plate may comprise a wall plate having a front face and a rear face opposite the front face, at least one electrical device opening extending through the wall plate and configured to align with a first electrical receptacle of an electrical device, at least two electrical plug prongs extending away from the rear face of the wall plate and configured to align with a second electrical receptacle of the electrical device, at least one charging port exposed on the wall plate and configured to receive power from the at least two electrical plug prongs and provide power to a charging plug when the charging plug is coupled with the at least one charging port, and at least one movable extension member configured to move in relation to the wall plate and support at least one electronic accessory device placed on the movable extension member.

Particular embodiments may comprise one or more of the following features. The charging port may be a universal serial bus port. The at least one movable extension member may be configured to move between an extended position and a compact position, when the at least one movable extension member is in the extended position, an outer edge of the movable extension member is distally located with regard to the front face, and when the at least one movable extension member is in the compact position, the outer edge of the movable extension member is proximally located with regard to the front face. The at least one movable extension member may further comprise at least two slidable support arms.

According to an aspect of the disclosure, a powered wall plate may comprise a wall plate having a front face and a rear face opposite the front face, at least one electrical device opening extending through the wall plate and configured to align with a first electrical receptacle of an electrical device, at least two electrical plug prongs extending away from the rear face of the wall plate and configured to align with a second electrical receptacle of the electrical device, and at least one extension member extending away from the front face and configured to support at least one electronic accessory device placed on the extension member.

Particular embodiments may comprise one or more of the following features. At least one charging port exposed on the wall plate and configured to receive power from the at least two electrical plug prongs. The at least one charging port may be a universal serial bus port. The at least one extension member may be configured to move in relation to the wall plate. The at least one extension member may be configured to move linearly away from and toward the front face. The at least one extension member may be configured to rotate away from and toward the front face. The at least one extension member may be configured to move between an extended position and a compact position, when the at least one movable extension member is in the extended position, an outer edge of the movable extension member is distally located with regard to the front face, and when the at least one movable extension member is in the compact position, the outer edge of the movable extension member is proximally located with regard to the front face.

According to an aspect of the disclosure, a powered wall plate may comprise a wall plate having a front face and a rear face opposite the front face, at least one electrical device opening extending entirely through the wall plate and sized to expose an electrical device therethrough, wherein the wall plate is configured to electrically couple with the electrical device, and at least one extension member configured to support at least one electronic accessory device placed on the movable extension member.

Particular embodiments may comprise one or more of the following features. At least one charging port may be exposed on the wall plate and configured to receive power from the electrical device when the powered wall plate is installed on the electrical device. The charging port may include a universal serial bus port. The at least one extension member may be configured to move in relation to the wall plate. The at least one extension member may be configured to move linearly away from and toward the front face. The at least one extension member may be configured to rotate away from and toward the front face. The at least one extension member may be configured to move between an extended position and a compact position, when the at least one movable extension member is in the extended position, an outer edge of the movable extension member is distally located with regard to the front face, and when the at least one movable extension member is in the compact position, the outer edge of the movable extension member is proximally located with regard to the front face. The electrical device may be a light switch. The at least one extension member may comprise an outer edge and a lip extending upward from the outer edge.

According to an aspect of the disclosure an electrical wall plate may comprise a front plate face and a rear plate face opposing the front plate face. Embodiments of an electrical wall plate may also comprise at least one electrical device opening extending through the front plate face and the rear plate face, At least one box mounting screw opening may be positioned so as to extend through both the front plate face and the rear plate face and may be configured to receive a box mounting screw so that the box mounting screw, when received, facilitates fastening of the electrical wall plate to an electrical device. A power connector may extend in a direction away from the front plate face and may be configured to connect with a power transmission conductor of the electrical device. At least one movable extension member may be configured to move between at least a first extended position, wherein an outer edge of the movable extension member is distally located with regard to the front plate face, and a second compact position, wherein the outer edge of the movable extension member is proximally located with regard to the front plate face. The movable extension member may be configured to receive and support at least one electronic accessory device placed on the movable extension member when the movable extension member is in the first extended position.

Particular embodiments may comprise one or more of the following features. The electrical device may be mounted in an electrical box. The electrical device may be an electrical receptacle. The at least one electrical device opening may be configured to permit a male conductive member of an electrical power plug to extend through the electrical device opening and engage with a female receiver of the electrical receptacle. The power connector may include at least two electrical plug blades and the electrical receptacle may include at least two female receivers configured to receive and conductively engage with the at least two electrical plug blades. The electrical device may be a light switch. The movable extension member may be configured to move and extend linearly and/or angularly away from and also back toward the front plate face. An included charging port may be configured to receive a plug of the electronic accessory device. The movable extension member may include a catch member configured to releasably secure the movable extension member into the second compact position, when it is maneuvered to the second compact position. The movable extension member may include a lock member configured to prevent the movable extension member from being completely disconnected from the electrical wall plate. In addition, the movable extension member may include a user engagement feature configured to be readily engaged by a user and facilitate movement of the movable extension member by the user.

According to an aspect of the disclosure an electrical wall plate may comprise a front plate face and a rear plate face opposing the front plate face. Embodiments of an electrical wall plate may also comprise at least one electrical device opening extending through the front plate face and the rear plate face. Moreover, embodiments of an electrical wall plate may further comprise at least one movable extension member, configured to move and extend away from and also back toward the front plate face and support at least one electronic accessory device placed on the movable extension member.

Particular embodiments may comprise one or more of the following features. The movable extension member may be configured to move and extend linearly and/or angularly away from and also back toward the front plate face. A plurality of movable extension members may each be configured to move and extend away from and also back toward the front plate face and support at least a portion of at least one electronic accessory device placed thereon. The electronic accessory device may be a smart phone. An included charging port may be configured to receive a charging plug from the smart phone, wherein the smart phone can recharge as it is plugged into the charging port and while it is supported by the movable extension member.

According to an aspect of the disclosure, an electrical wall plate may comprise at least one electrical device opening extending entirely through the electrical wall plate. Embodiments of an electrical wall plate may also comprise at least one box mounting screw opening extending entirely through the electrical wall plate, wherein the at least one box mounting screw opening is positioned to permit insertion and transversal by a box mounting screw in a manner wherein the box mounting screw, when inserted through the at least one box mounting screw opening, extends into a corresponding opening of an electrical device and extends into a corresponding opening of an electrical box and facilitates fastening of the electrical wall plate to both the electrical device and the electrical box. Furthermore, embodiments of an electrical wall plate may comprise at least one movable extension member, configured to move and support at least one electronic accessory device placed on the movable extension member.

Particular embodiments may comprise one or more of the following features. The electrical wall plate may include a plurality of electrical device openings. The plurality of electrical device openings may be configured for multiple gangs permitting operation of the wall plate with a corresponding plurality of electrical devices, wherein each device of the plurality of electrical devices may be mounted to the electrical wall plate and fastened within the electrical box by a corresponding plurality of box mounting screws extending through a corresponding plurality of box mounting screw openings. The electrical wall plate may be formed of a plastic material. The electrical wall plate may be configured for outdoor and/or indoor use.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function The foregoing and other features, advantages and construction of the present disclosure will become more readily apparent and fully appreciated from the following more DETAILED DESCRIPTION of the particular embodiments and appended CLAIMS, in conjunction with the accompanying DRAWINGS.

BRIEF DESCRIPTION OF THE DRAWINGS

To further clarify the above and other advantages and features of the present disclosure, some of the embodiments will be described in detail, with reference to the following figures, wherein like designations denote like members. It is appreciated that these figures depict only illustrated embodiments pertinent to the present disclosure and are therefore not to be considered limiting of inventive scope. As such, the present disclosure will be set forth and explained with additional specificity and detail through the use of the accompanying drawings in which:

FIG. 2 illustrates a front view of the electrical wall plate of FIG. 1;

FIG. 3 illustrates a side view of the electrical wall plate of FIG. 1;

FIG. 4 illustrates a top view of the electrical wall plate of FIG. 1;

FIG. 5 illustrates a front perspective view of the electrical wall plate of FIG. 1 having an embodiment of an electronic accessory device resting on and supported by an embodiment of a movable extension member of the electrical wall plate;

FIG. 6 illustrates a perspective view of an embodiment of a movable extension member;

FIG. 7 illustrates a perspective view of a common electrical power plug;

FIG. 9 illustrates a front view of the electrical wall plate of FIG. 8;

FIG. 10 illustrates a side view of the electrical wall plate of FIG. 8;

FIG. 11 illustrates a top view of the electrical wall plate of FIG. 8;

FIG. 17 illustrates a front view of an embodiment of an electrical wall plate mounted to a plurality of electrical devices;

FIG. 18 illustrates a rear view of an embodiment of an electrical wall plate mounted to a plurality of electrical devices;

DETAILED DESCRIPTION

A detailed description of the hereinafter described embodiments of the disclosed apparatuses, systems and methods are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

Figure 1:
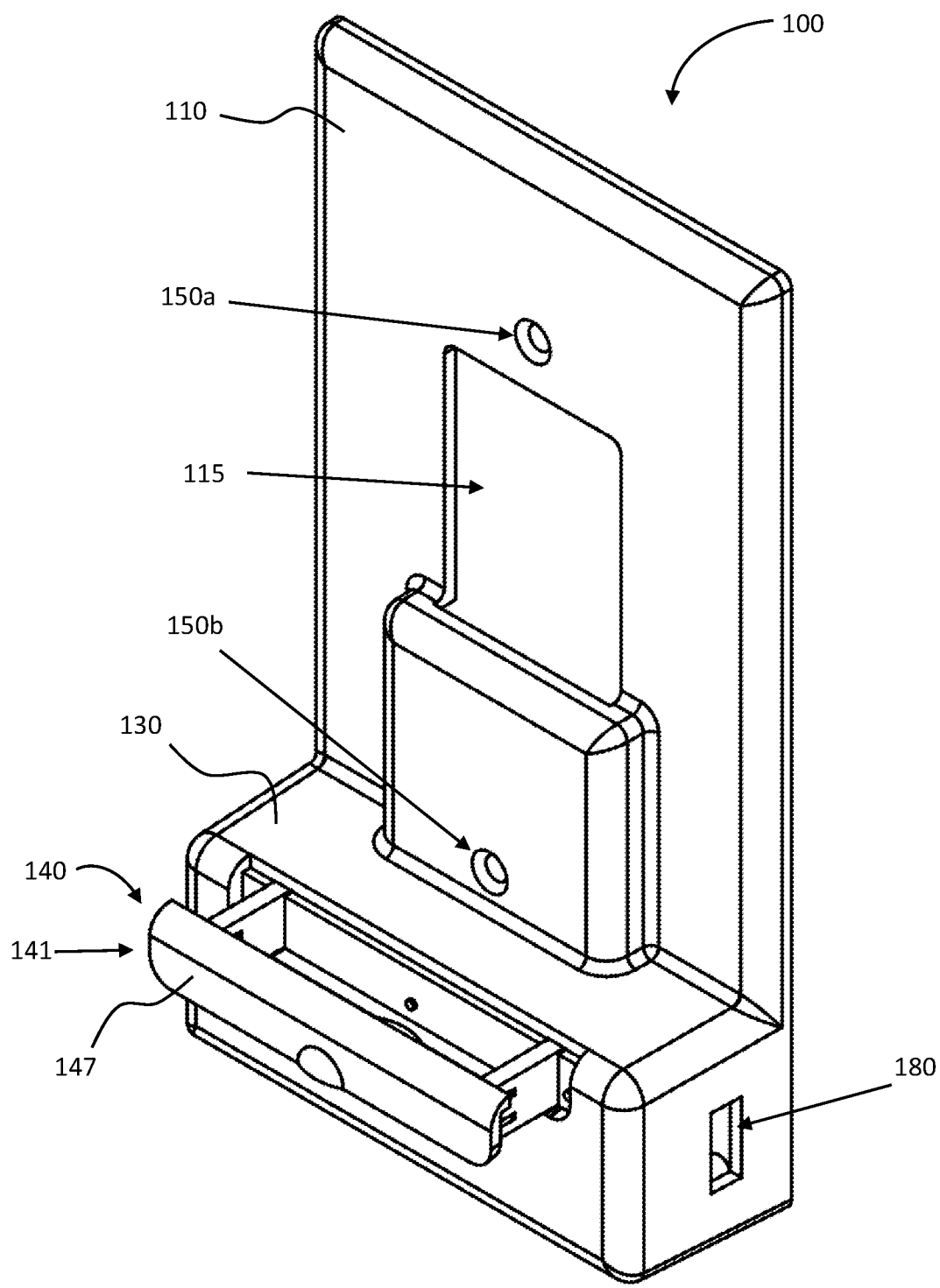
FIG. 1 illustrates a front perspective view of an embodiment of an electrical wall plate comprising a movable extension member in a first extended position.
Figure 8:
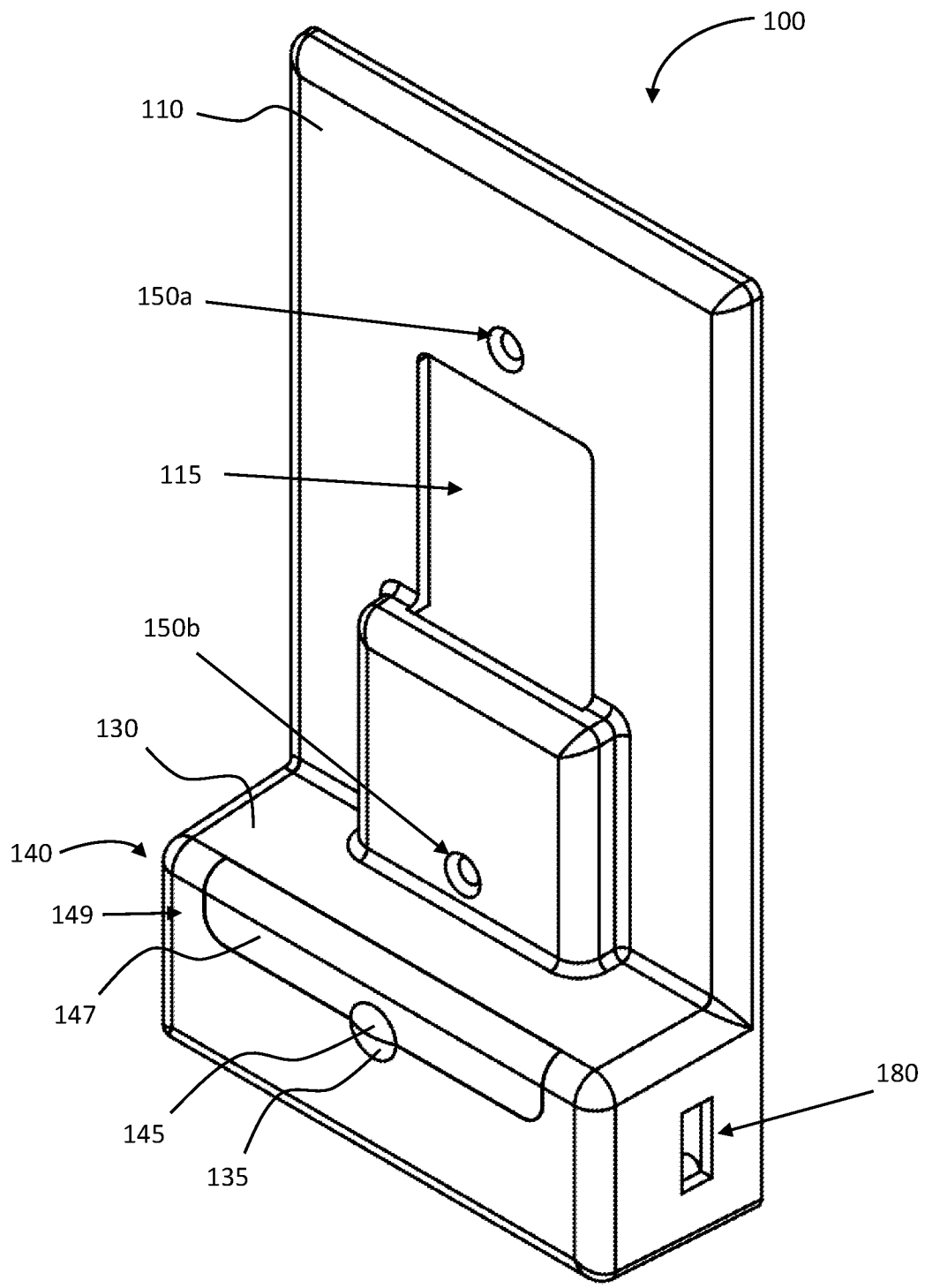
FIG. 8 illustrates a front perspective view of an embodiment of an electrical wall plate comprising a movable extension member in a second compact position.

A need exists for an electrical wall plate including a movable mechanical feature for supporting an electronic accessory device. Referring to the drawings, FIG. 1 depicts a front perspective view of an embodiment of an electrical wall plate 100 comprising a movable extension member, in a first extended position, that solves the aforementioned problems. As depicted, the electrical wall plate 100 may include a front plate face 110. An electronic device opening 115 may extend through the front plate face 110 of the electrical wall plate 100. In addition, the electrical wall plate may include a housing 130. The housing 130 may house electronic components, such as an electrical power transformer, a transmitter, such as an antenna, a printed circuit board, a memory storage component, a battery, a microphone, a speaker, a sensor or multiple sensors, such as a smoke detector or a carbon monoxide detector, a fragrance storage and release element, and/or a mechanical element such as a motor or a structural feature configured to movably extend from the housing 130, and/or other like components. A charging port 180, such as a universal serial bus port or other standard cable connection interface for charging and/or communicating with electronic accessory devices such as smart phones or tablet computers etc., may be provided in association with the housing for connecting an electronic accessory device to the electrical wall plate 100.

Embodiments of an electrical wall plate 100 may include a movable extension member 140. Embodiments of a movable extension member 140 may be moved, or otherwise maneuvered by a user, to a first extended position 141, wherein an outer edge 147 of the movable extension member 140 may be distally located with regard to the front plate face 110. One or more openings, such as box mounting screw openings 150a and 150b, may extend through the electrical wall plate 100 and be positioned on the electrical wall plate 100 so as to correspond to similar openings or mechanical features of an electrical device, such as a light switch or and electrical receptacle, or socket fixture. The box mounting screw openings 150a and 150b may facilitate mounting of the electrical wall plate 100 to the electrical device and also to an electrical box.

With further reference to the drawings, FIGS. 2-4 depict front, side and top views, respectively, of the electrical wall plate of FIG. 1. As can be seen, embodiments of an electrical wall plate 100 may comprise a rear face plate 120 opposing the front face plate 110. Embodiments or an electrical wall plate 100, especially as seen in the side view of FIG. 3, may be plate-like, wherein a significant portion of the electrical wall plate comprises a relatively thin plate that may be fitted to a wall around a portion of an electrical device 10, such as an electrical receptacle, to prevent unwanted access to the electrical device 10. The plate-like electrical wall plate 100 may have curved, rounded, chamfered, or beveled edges, wherein the edges of the electrical wall plate 100 may protrude or curve somewhat out of plane with regard to the front plate face 110 and the rear plate face 120.

Embodiments of an electrical wall plate 100 may facilitate a resting or storage location for embodiments of an electronic accessory device, such as a smart phone or tablet computer. For example, FIG. 5 depicts a front perspective view of an electrical wall 100 having an embodiment of an electronic accessory device 1000 resting on and supported by an embodiment of a movable extension member 140 of the electrical wall plate 100. Notably, a significant portion of the electrical device opening 115 may still be exposed when the electronic accessory device 1000 is stored on the movable extension member 140 of the electrical wall plate, thereby permitting access to an electrical device, such as an electrical receptacle, through the opening 115, even when the electronic accessory device 1000 is positioned on the movable extension member 140.

Referring still further to the drawings, FIG. 6 illustrates a perspective view of an embodiment of a movable extension member 140 of an embodiment of an electrical wall plate 100. The movable extension member 140 may include one or more support arms, such as slidable support arms 144a and 144b. The slidable support arms 144a-b may operate with and engage a portion of the electrical wall plate 100, such as a portion of the housing 130 of the electrical wall plate 100. In operation, the slidable support arms 144a-b may slide linearly away from the front face 110 of the electrical wall plate 100, and may also slide linearly toward the front face 110 of the electrical wall plate 100. The slidable support arms 144a-b may be configured to help support an electronic accessory device 1000, such as a smart phone or a tablet computer, resting on the movable extension member 140.

Embodiments of a movable extension member 140 may include further component features that may facilitate efficient operation. For instance, movement hindering elements, such as catch members 146a and 146b, may mechanically engage corresponding features of another portion of the electrical wall plate to help retain the movable extension member in a designated position, such as a second compact position 141 (see FIGS. 8-12 and 14), unless a sufficient amount of force is applied to the movable extension member 140 to disengage the catch members 146a-b and move the movable extension member 140. The catch members 146a-b may be configured to releasably secure the movable extension member 140 into the second compact position 141, when it is maneuvered to the second compact position 141. Moreover, the catch members 146a-b and/or corresponding engagement features of the electrical wall plate 100 may have ramped surfaces to facilitate free movement of the movable extension member 140 once enough force is applied to move the catch members 146a-b out of engagement. The movement hindering members may be and/or include bumps, dimples, grooves, ridges or other like static features, and/or compliant features, such as the spring-biased catch members 146a-b. Still further, embodiments of a movable extension member may include locking members, such as lock members 148a and 148b, configured to prevent the movable extension member 140 from being completely disconnected from the electrical wall plate 100. The lock members 148a-b may include structural and functional features that facilitate and permit mechanical interlocking and restrict movement of the movable extension member 140 beyond a certain point. Such lock members 148a-b may help ensure that a user doesn't accidentally maneuver the movable extension member 140 completely out of contact with the rest of the electrical wall plate 100. Embodiments of a movable extension member 140 may include one or more user engagement features, such as user engagement feature 145, configured to be readily engaged by a user and facilitate movement of the movable extension member 140 by the user. In addition a movable extension member 140 may include a lip or retaining feature 142 extending upward at a front edge of the movable extension member 140 and configured to physically interact with and assist in retaining an electronic accessory device 100 securely positioned on the movable extension member 140.

Certain embodiments of an electrical wall plate 100 may be configured to operate with an electrical plug, such as electrical plug 1 depicted in FIG. 7. The electrical plug 1 may comprise an electrical connector on the end of an electrical cord 2. The electrical plug, such as electrical plug 1, may comprise at least one male conductive member, such as electrical plug blades 6a-6c. Those of ordinary skill in the relevant art will appreciate that the size and geometry of the electrical plug 1, along with the size and relative positioning of the at least one male conductive member, such as electrical plug blades 6a-6c, may be structured in accordance with standard requirements set forth by various geographic regions. As depicted, the embodiment of the electrical plug 1 is structured to comport with structural standards pertaining to the United States and Canada.

With further reference to the drawings, FIGS. 8-11 respectively illustrate a front perspective view, a front view, a side view and a top view of an embodiment of an electrical wall plate 100 comprising a movable extension member 140 in a second compact position 149. When the movable extension member 140 is in a second compact position 149 the outer edge 147 of the movable extension member 140 is proximally located with regard to the front plate face 110 of the electrical wall plate 100. As further depicted, an electrical wall plate 100 may include an additional user engagement feature 135, formed as an indentation of the housing 130 and positioned to allow a user to more readily grasp or otherwise engage the user engagement feature 145 of the movable extension member 140.

Figure 12:
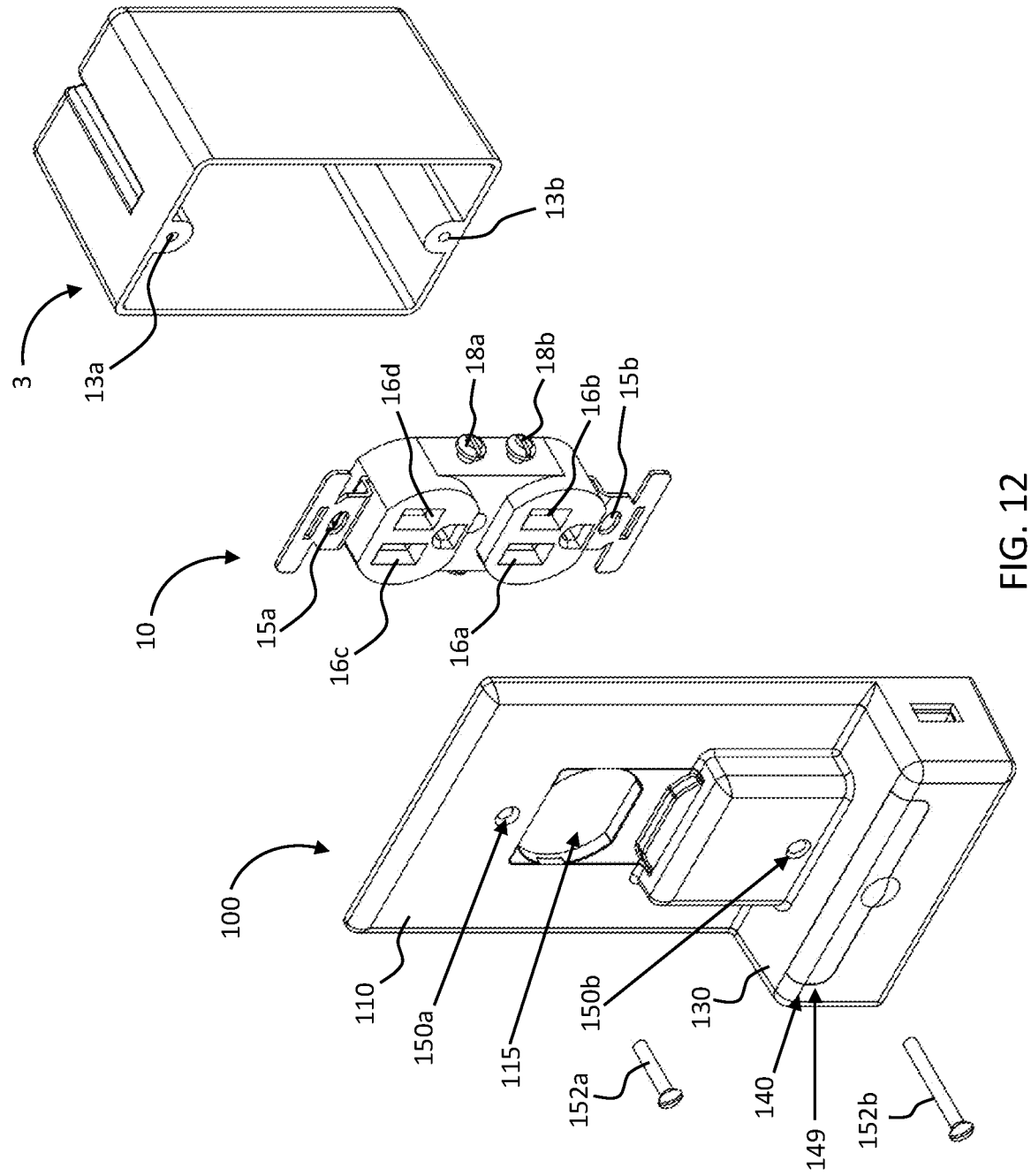
FIG. 12 illustrates an exploded front perspective view of an embodiment of an electrical wall plate prior to being mounted to an embodiment of an electrical device and an embodiment of an electrical box via embodiments of box mounting screws.

Various components potentially operable with embodiments of an electrical wall plate 100 are additionally revealed in the exploded front perspective view depicted in FIG. 12, which illustrates an embodiment of an electrical wall plate 100 prior to being mounted to an embodiment of an electrical device 10 and an embodiment of an electrical 3 box via embodiments of box mounting screws 150a-b. As shown, the one or more box mounting screw openings 150a-b of the electrical wall plate may be configured to receive fasteners, such as box mounting screws 152a and 152b. In addition, when the one or more corresponding box mounting screws 152a and 152b are received within the box mounting screw openings 150a and 150b, the box mounting screws 152a and 152b may facilitate fastening of the electrical wall plate 100 to an electrical device 10, such as a light switch or an electrical receptacle as shown. The one or more box mounting screw openings 150a and 150b may be positioned to permit insertion and transversal by one or more respective box mounting screws 152a and 152b in a manner wherein the one or more box mounting screws 152a and 152b, when inserted through the one or more box mounting screw openings 150a and 150b, extend into one or more corresponding openings 15a and 15b of an electrical device 10 and also extend into one or more corresponding openings 13a and 13b of an electrical box 3 and facilitate fastening of the electrical wall plate 100 to both the electrical device 10, such as a light switch or an electrical receptacle, and the electrical box 3.

Figure 13:
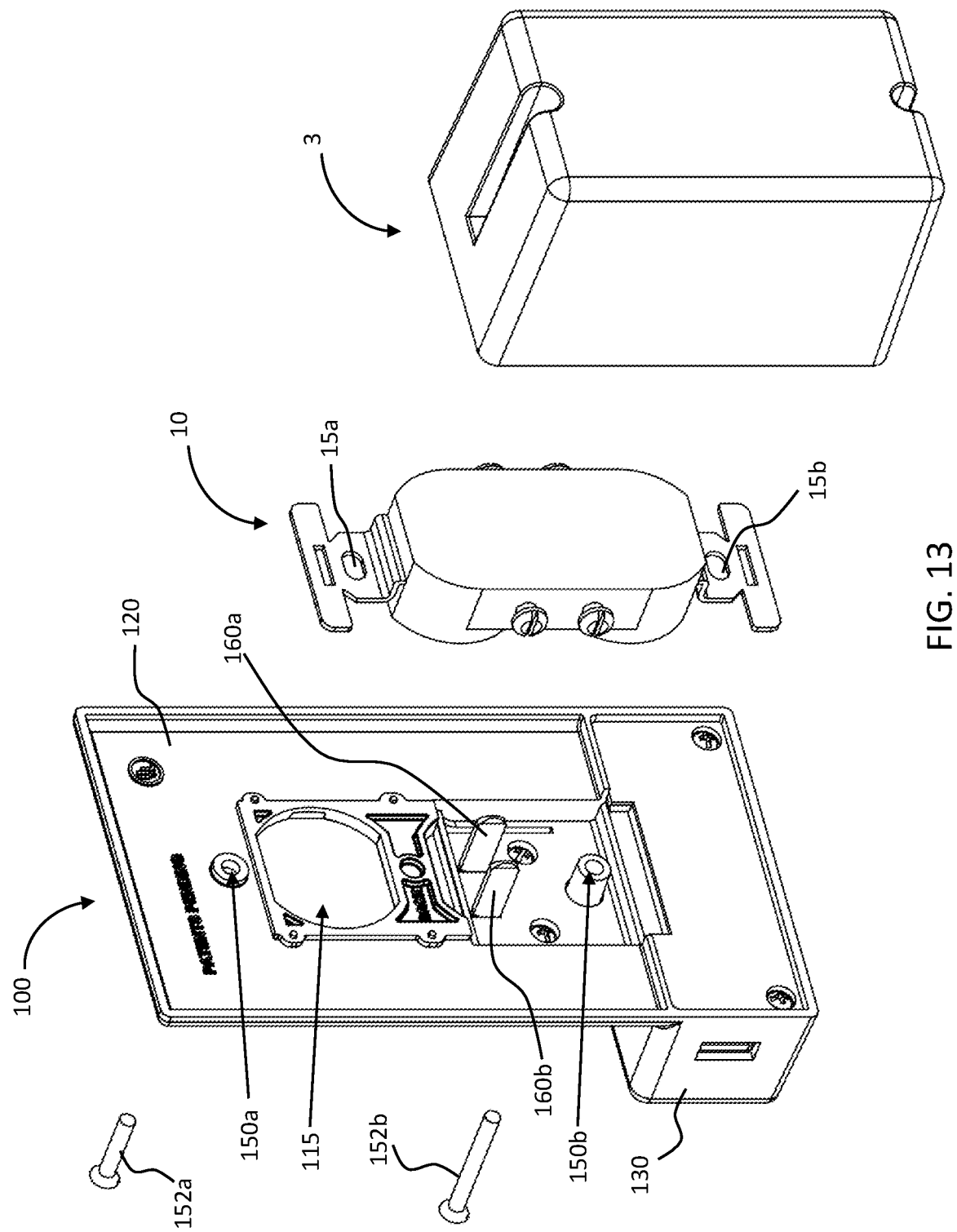
FIG. 13 illustrates an exploded rear perspective view of an embodiment of an electrical wall plate prior to being mounted to an embodiment of an electrical device and an embodiment of an electrical box via embodiments of box mounting screws.

Referring to FIG. 13, which depicts an exploded rear perspective view of an embodiment of an electrical wall plate 100 prior to being mounted to an embodiment of an electrical device 10 and an embodiment of an electrical box 3 via embodiments of box mounting screws 150a-b, embodiments of an electrical wall plate 100 may include a power connector 160. The power connector 160 may be located and structured so that it protrudes beyond the rear face plate 120 of the electrical wall plate 100. Embodiments of a power connector 160 may be conductive and configured to electrically connect with a power transmission conductor of an electrical device 10, such as electrical power transmission conductors 16a and 16b, or other like power transmission conductors, of the electrical receptacle device 10.

The power connector 160 may be embodied as at least two electrical plug blades, such as electrical plug blades 160a and 160b, which perpendicularly protrude beyond the rear face plate 120. The electrical power connector 160 may include a plurality of connecting features, such as electrical plug blades 160a and 160b. Those of ordinary skill in the relevant art will recognize the electrical plug blades, such as electrical plug blades 160a and 160b, may be structures having standardized dimension and conductivity in compliance with common electrical devices, such as plug and receptacle features having standardized dimensions associated with various geographic regions. For instance, as depicted, the electrical plug blades 160a and 160b are structured in accordance with typical plug blade structure in the United States and Canada. However, plug blades, or rather electrical power connector 160 features of embodiments of an electrical wall plate 100 may be structured in accordance with other geographic areas, such as continental Europe, the UK, Australia, China, Japan and any other geographic area having known standardized structure and performance requirements. Likewise, those of ordinary skill in the art will recognize that the component elements of an electrical wall plate 100 may be configured for operation applicable to any voltage, amperage, frequency, wattage, and/or other like electromagnetic characteristic commensurate with standardized functional requirements pertaining to any geographical area. The charging port 180 and other electronic components may function with assistance of known conversion elements, such as operation by transformers, resisters, capacitors, diodes, transistors, A/D converters, integrated circuits and/or other like basic electronic components.

An opening, such as electrical device opening 115, may extend through the front plate face 110 and the rear plate face 120 of the electrical wall plate 100, wherein the electrical device opening 115 may be configured to permit a power transmission conductor, such as electrical plug blades 6a-6c, of an electrical power plug, such as power plug 1 (depicted in FIG. 7), to extend through the electrical device opening 115 and conductively engage with a power transmission component, such as female receivers 16c and 16d, of the electrical device 10 onto which the electrical wall plate 100 has been mounted. Electronic components, such as the charging port 180 or other electronic components, may be in electrical connection with the power connector 160, such as electrical plug blades 160a and 160b, and may be configured to operate by electrical power obtained from the electrical device 10, when the power connector 160 is connected to the power transmission conductor, such as female receivers 16a and 16b of the electrical device 10. The female receivers 16a and 16b may be configured to receive and electrically engage the electrical plug blades 160a and 160b, when the electrical wall plate 100 is mounted on the electrical device 10. Those of ordinary skill in the art will recognize that electrical connection between the electrical wall plate 100 and the electrical device 10 may be operatively effectuated by connection with the female receivers 16a and 16b and/or the wire mounts 18a and 18b, with each connection arrangement offering different advantages. For instance, electrical connection between the power connector 160, such as electrical plug blades 160a and 160b, and the female receivers 16a and 16b happens commensurate with the engagement of the electrical wall plate 100 with the electrical device 10, as the electrical wall plate 100 is mounted to the electrical device 10. A direct wired connection, utilizing a wired power connector 160 electrically connected with and physically mounted to the wire mounts 18*a* and 18*b* may facilitate continuous electrical connection of the electrical wall plate 100 with the electrical device 10, such as an electrical receptacle, even if the electrical wall plate 100 is spaced apart a distance from the electrical device 10 and not fully physically mounted and/or fastened thereto.

Figure 15:
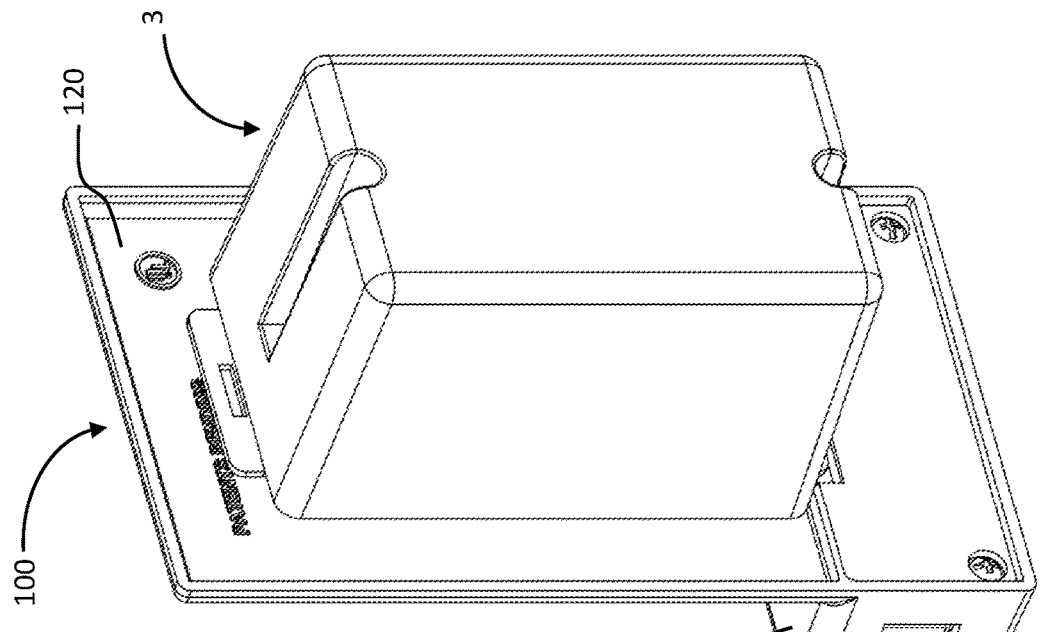
FIG. 15 illustrates a rear perspective view of an embodiment of an electrical wall plate mounted to an embodiment of an electrical device and an embodiment of an electrical box via embodiments of box mounting screws.
Figure 14:
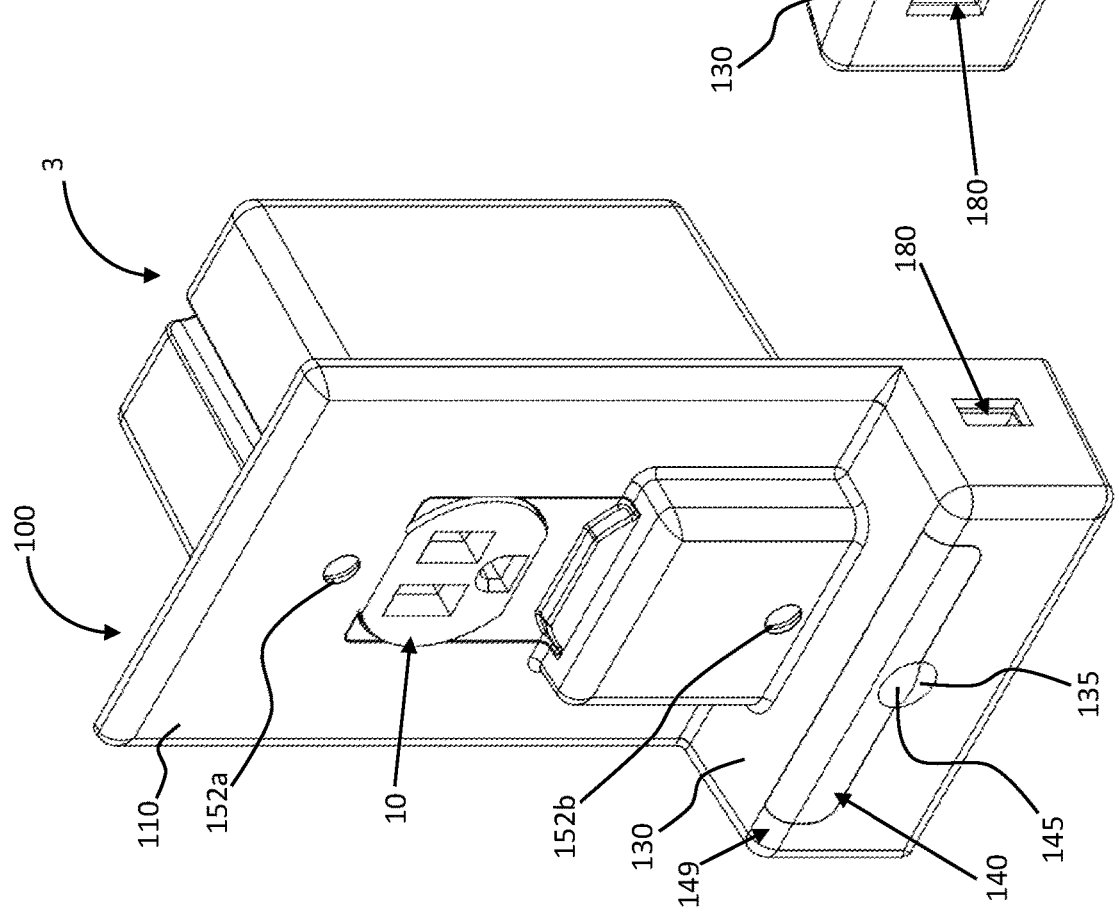
FIG. 14 illustrates a front perspective view of an embodiment of an electrical wall plate mounted to an embodiment of an electrical device and an embodiment of an electrical box via embodiments of box mounting screws.

Embodiments of an electrical wall plate 100 may be mounted to an electrical device 10 and an electrical box 3, such as respectively depicted in front and rear perspective view illustrated by FIGS. 14 and 15. When mounted to the electrical device 10 and/or the electrical box 3, the movable extension member 140 may remain highly accessible and capable of engagement by a user intending to maneuver the movable extension member 140 between a first extended position 141 and a second compact position 149. Additionally, the rear perspective view, particularly afforded by FIG. 15 reveals how the rear plate face 120 of the electrical wall plate 100 may be substantially flush-mounted to the electrical box 3 and thereby protect the electrical device 10, such as an electrical receptacle, housed by the electrical box 3, from undesired accessibility.

Electronic components potentially integrated into the electrical wall plate 100, such as the charging port 180, may be powered with electricity obtained through an electrical connection of the electrical wall plate 100 and the electrical device 10 via engagement and reception of the power connector 160, such as electrical plug blades 160*a* and 160*b*, with the power transmission conductor, such as female receivers 16*a* and 16*b*, of the electrical device 10. Fasteners, such as one or more box mounting screws 152*a* and 152*b*, may be inserted into and pass or transverse through and potentially engage one or more openings 150*a* and 150*b* of the electrical wall plate 100 and pass through and engage with the one or more corresponding openings 15*a* and 15*b* of the electrical device 10 and openings 13*a* and 13*b* of the electrical box 3. As depicted, the electrical box 3 may reside on the side of the electrical wall plate 100 associated with the rear plate face 120, while the movable extension member 140 may reside on the side of the electrical wall plate 100 associated with the front plate face 110. The electrical device 10, such as an electrical receptacle, may reside substantially within the electrical box 3, and may include electrical connection features that are inaccessible when the electrical box 3 is mounted to the electrical wall plate 100.

Figure 16:
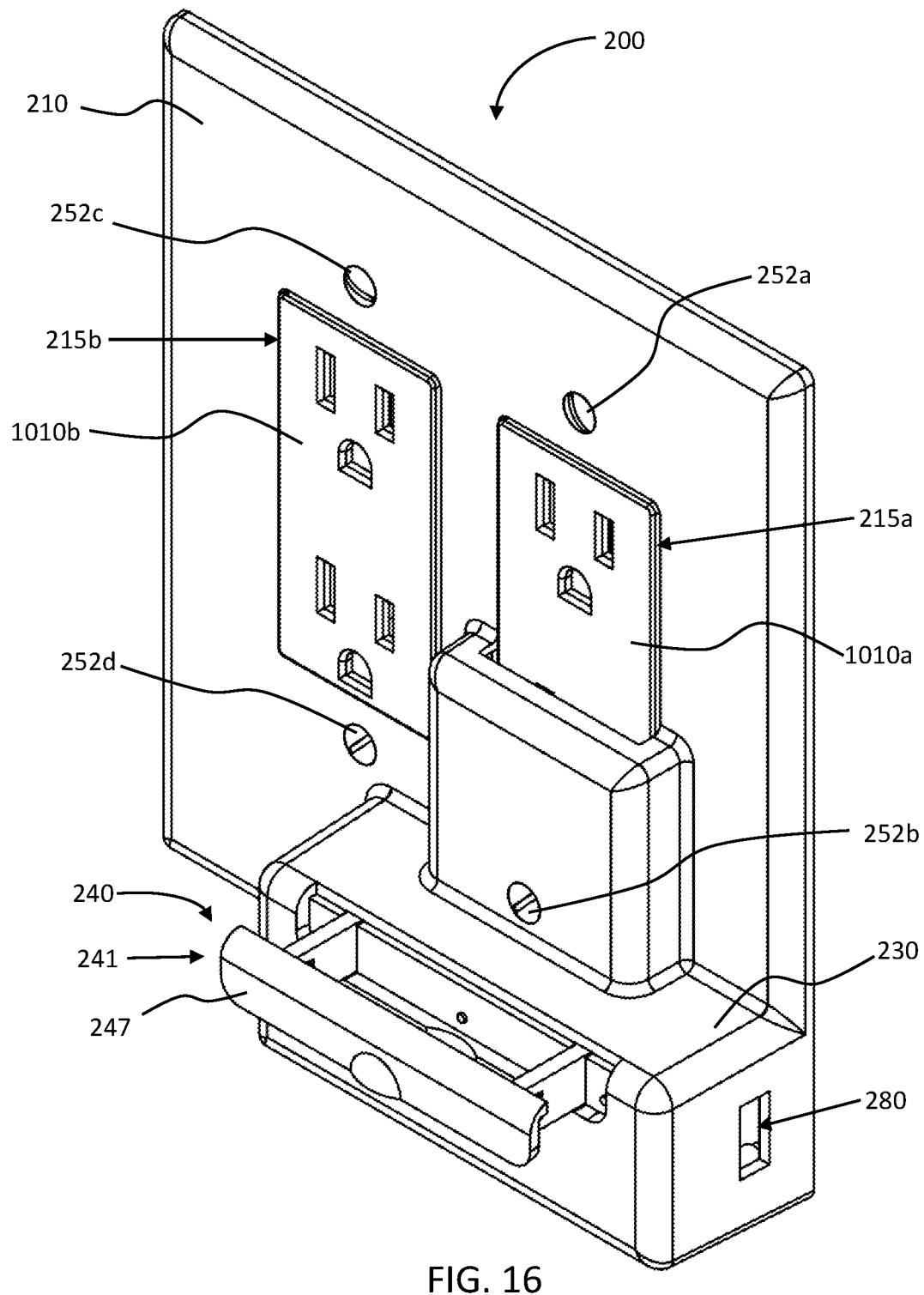
FIG. 16 illustrates a front perspective view of an embodiment of an electrical wall plate mounted to a plurality of electrical devices.

With continued reference to the drawings, FIGS. 16-18 respectively illustrate a front perspective view, and front view and a rear view of an embodiment of an electrical wall plate 200 mounted to a plurality of electrical devices 1010*a* and 1010*b*. The electrical wall plate 200 may include a plurality of electrical device openings 215*a* and 215*b*. The plurality of electrical device openings 215*a* and 215*b* may be configured for multiple gangs permitting operation of the wall plate with a corresponding plurality of electrical devices 1010*a* and 1010*b*, such as electrical receptacles, wherein each device of the plurality of electrical devices 1010*a*-*b* may be mounted to the electrical wall plate 200 and fastened within an electrical box, such as electrical box 3, by a corresponding plurality of box mounting screws 252*a*-*d* extending through a corresponding plurality of box mounting screw openings.

As depicted, the multiple gang electrical wall plate 200 includes only one movable extension member 240. However, those of ordinary skill in the art will recognize that embodiments of an electrical wall plate 200 may include a plurality of movable extension members 240, wherein each of the movable extension members 240 of the plurality of movable extension members 240 may be configured to move and extend away from and also back toward the front plate face 210 and support at least a portion of at least one electronic accessory device, such as a smart phone or tablet computer, placed thereon. Each movable extension member 240 may reside in a first extended position 241, wherein an outer edge 247 of each movable extension member 240 may be distally located with regard to the front plate face 210 and may include a lip or raised portion to assist in retaining an electronic device on top of the movable extension member 240. In addition, each movable extension member may operate with a housing 230 and each housing 230 may house a charging port 280. The plurality of electrical devices, such as electrical devices 1010*a* and 1010*b* may be substantially flush-mounted to the rear plate face 220 of the electrical wall plate 200.

Figure 20:
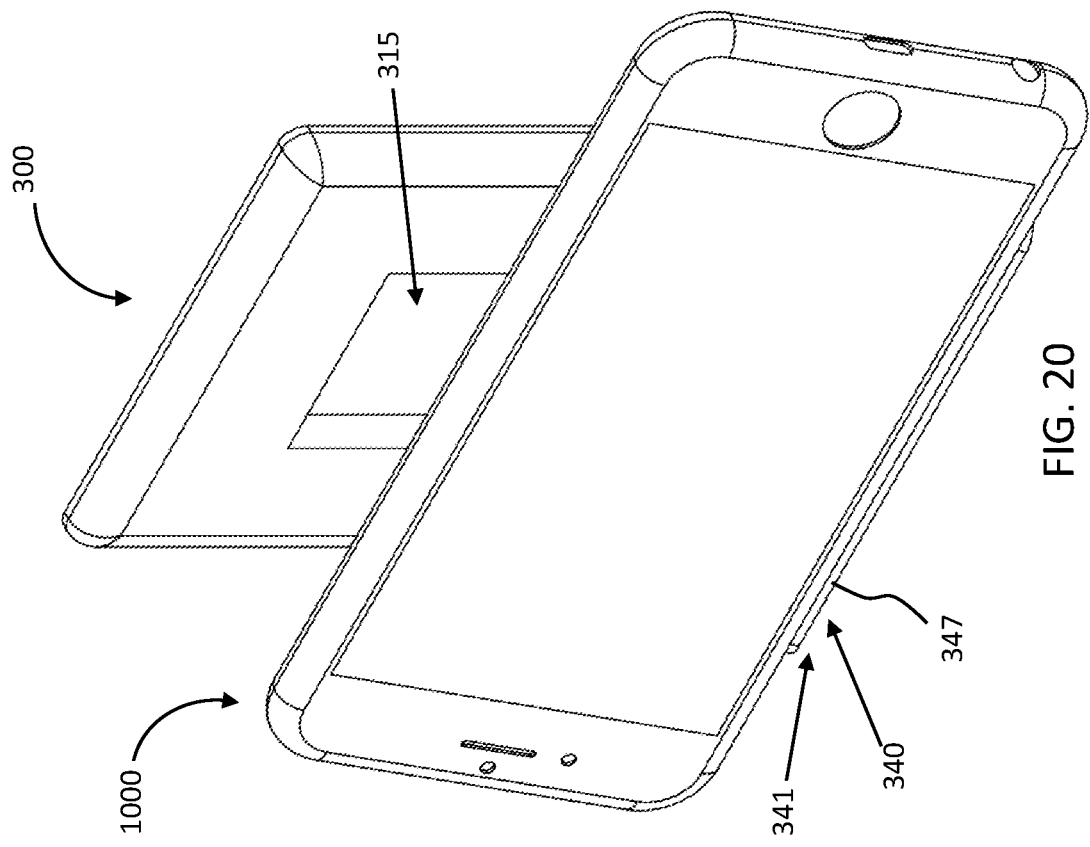
FIG. 20 illustrates a front perspective view of the electrical wall plate embodiment of FIG. 19 having an embodiment of an electronic accessory device resting on and supported by an embodiment of a movable extension member of the electrical wall plate.
Figure 19:
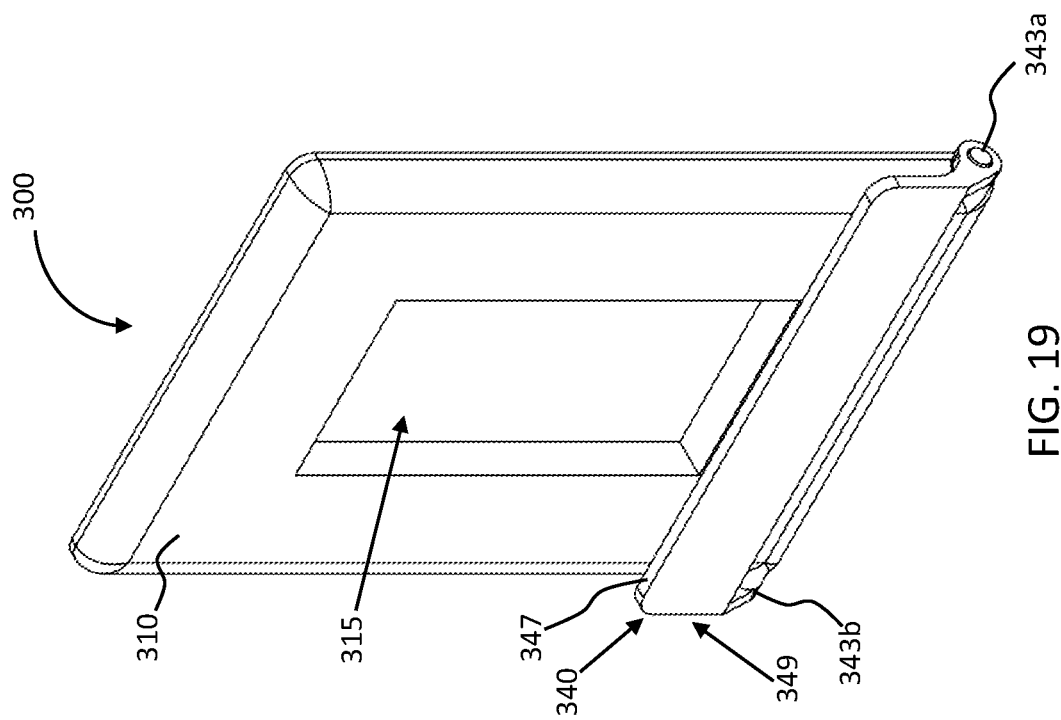
FIG. 19 illustrates a front perspective view of another embodiment of an electrical wall plate comprising a movable extension member in a second compact position.

Referring still further to the drawings, FIG. 19 illustrates a front perspective view of another embodiment of an electrical wall plate 300 comprising a movable extension member 340 in a second compact position 349, wherein an outer edge 347 of the movable extension member 340 is proximally located with regard to the front plate face 310 of the electrical wall plate 300. The electrical wall plate 300 may include an electrical device opening 315. The movable extension member 340 may be configured to move and extend angularly away from and also back toward the front plate face 310. The angular movement may be facilitated by hinge connections 343*a* and 343*b*, which hinge connections 343*a* and 343*b* may allow the movable extension member 340 to pivot and extend away from the front plate face 310 of the electrical wall plate 300, until a mechanical abutment or other physical feature prevents the movable extension member 340 from pivoting further. Accordingly, FIG. 20 depicts a front perspective view of the electrical wall plate 300 having an embodiment of an electronic accessory device 100, such as a smart phone, resting on and supported by an embodiment of a movable extension member 240 of the electrical wall plate 300, when the movable extension member 340 is in a first extended position 341, wherein the outer edge 347 is distally located from the front plate face 310 of the electrical wall plate 300. Notably, a significant portion of the electrical device opening 315 may still be exposed when the electronic accessory device 1000 is stored on the movable extension member 340 of the electrical wall plate 300, thereby permitting access to an electrical device, such as an electrical receptacle, through the opening 315, even when the electronic accessory device 1000 is positioned on the movable extension member 340.

Embodiments of an electrical wall plate, such as electrical wall plates 100, 200, and 300 and the like, may be configured to connect with a power transmission conductor of an electrical device, such as, for example, electrical receptacle devices 10 and 1010*a*-*b*. Additionally, electrical wall plate embodiments, such as electrical wall plate embodiments 100, 200 and 300 disclosed herein, may also be configured to mount to and operate with different electrical devices 10, such as light switches, dimmers, communications ports, and electrical receptacles, or socket fixtures. The respective electrical device openings 115, 215*a*, 215*b* and 315 may be sized to facilitate operable engagement with the various electrical devices 10. For example, the electrical device opening 115, 215*a*, 215*b* and/or 315 or other like openings of the electrical wall plate 100, 200 and/or 300 or other like electrical wall plates may be sized to facilitate access to a "Test" button and a "Reset" button commonly found on the receptacle face of the standard ground fault circuit interrupter (GFCI) electrical receptacle utilized in the United States and Canada. Furthermore, electrical wall plate embodiments, such as electrical wall plate embodiments 100, 200 and 300, may be formed of plastic, metal, wood, porcelain, composites, or any operable combination thereof. Still further, electrical wall plate embodiments, such as electrical wall plate embodiments 100, 200 and 300, may be configured for outdoor use, indoor use and/or universal outdoor/indoor use. Multiple gang embodiments of sufficient size may be configured to support a plurality of electronic accessory devices 1000, such as a smart phone and a tablet computer at the same time. Moreover, electrical wall plate embodiments may include movable extension members that employ multiple telescoping components, that incorporate folding features, that provide threaded elements facilitating threaded movement and/or any like features facilitating movement of the movable extension members away from and back towards the front plate face of the electrical wall plate. It is contemplated that embodiments of an electrical wall plate may include motors, magnets, pneumatic elements, hydraulic components, servos, springs, rods, gear assemblies and other like features that may be provided to automate the extension away from and movement back towards the front face plate of the electrical wall plate by an operably driven movable extension member.

While this disclosure has been described in conjunction with the specific embodiments outlined above, it is evident that many alternatives, modifications and variations will be apparent to those skilled in the art. Accordingly, the described and depicted embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A powered wall plate, comprising:
a wall plate having a front face and a rear face opposite the front face;
at least one electrical device opening extending through the wall plate and configured to align with a first electrical receptacle of an electrical device;
at least two electrical plug prongs extending away from the rear face of the wall plate and configured to align with a second electrical receptacle of the electrical device;
at least one charging port exposed on the wall plate and configured to receive power from the at least two electrical plug prongs and provide power to a charging plug when the charging plug is coupled with the at least one charging port; and
at least one movable extension member configured to move in relation to the wall plate and support at least one electronic accessory device placed on the movable extension member.

2. The powered wall plate of claim 1, wherein the charging port is a universal serial bus port.

3. The powered wall plate of claim 1, wherein the at least one movable extension member is configured to move between an extended position and a compact position, when the at least one movable extension member is in the extended position, an outer edge of the movable extension member is distally located with regard to the front face, and when the at least one movable extension member is in the compact position, the outer edge of the movable extension member is proximally located with regard to the front face.

4. The powered wall plate of claim 1, the at least one movable extension member further comprising at least two slidable support arms.

5. A powered wall plate, comprising:
a wall plate having a front face and a rear face opposite the front face;
at least one electrical device opening extending through the wall plate and configured to align with a first electrical receptacle of an electrical device;
at least two electrical plug prongs extending away from the rear face of the wall plate and configured to align with a second electrical receptacle of the electrical device; and
at least one extension member extending away from the front face and configured to support at least one electronic accessory device placed on the extension member.

6. The powered wall plate of claim 5, further comprising at least one charging port exposed on the wall plate and configured to receive power from the at least two electrical plug prongs.

7. The powered wall plate of claim 6, wherein the at least one charging port is a universal serial bus port.

8. The powered wall plate of claim 5, wherein the at least one extension member is configured to move in relation to the wall plate.

9. The powered wall plate of claim 8, wherein the at least one extension member is configured to move linearly away from and toward the front face.

10. The powered wall plate of claim 8, wherein the at least one extension member is configured to rotate away from and toward the front face.

11. The powered wall plate of claim 8, wherein the at least one extension member is configured to move between an extended position and a compact position, when the at least one movable extension member is in the extended position, an outer edge of the movable extension member is distally located with regard to the front face, and when the at least one movable extension member is in the compact position, the outer edge of the movable extension member is proximally located with regard to the front face.

12. A powered wall plate, comprising:
a wall plate having a front face and a rear face opposite the front face;
at least one electrical device opening extending entirely through the wall plate and sized to expose an electrical device therethrough, wherein the wall plate is configured to electrically couple with the electrical device; and
at least one extension member configured to support at least one electronic accessory device placed on the movable extension member.

13. The powered wall plate of claim 12, further comprising at least one charging port exposed on the wall plate and configured to receive power from the electrical device when the powered wall plate is installed on the electrical device.

14. The powered wall plate of claim 13, wherein the charging port is a universal serial bus port.

15. The powered wall plate of claim 12, wherein the at least one extension member is configured to move in relation to the wall plate.

16. The powered wall plate of claim 15, wherein the at least one extension member is configured to move linearly away from and toward the front face.

17. The powered wall plate of claim 15, wherein the at least one extension member is configured to rotate away from and toward the front face.

18. The powered wall plate of claim 15, wherein the at least one extension member is configured to move between an extended position and a compact position, when the at least one movable extension member is in the extended position, an outer edge of the movable extension member is distally located with regard to the front face, and when the at least one movable extension member is in the compact position, the outer edge of the movable extension member is proximally located with regard to the front face.

19. The powered wall plate of claim 12, wherein the electrical device is a light switch.

20. The powered wall plate of claim 12, the at least one extension member comprising an outer edge and a lip extending upward from the outer edge.

* * * * *